US009022356B2

(12) United States Patent
Flournoy et al.

(10) Patent No.: US 9,022,356 B2
(45) Date of Patent: May 5, 2015

(54) REMOVABLE SADDLE AND EXTENSION FOR FLOOR JACK

(75) Inventors: Matthew Flournoy, South Bend, IN (US); Andrew L. Tallman, Manhattan Beach, CA (US)

(73) Assignee: Norco Industries, Inc., Compton, CA (US)

( * ) Notice: Subject to any disclaimer, the term of this patent is extended or adjusted under 35 U.S.C. 154(b) by 258 days.

(21) Appl. No.: 13/599,402

(22) Filed: Aug. 30, 2012

(65) Prior Publication Data

US 2014/0061555 A1 Mar. 6, 2014

(51) Int. Cl.

| | |
|---|---|
| ***B66F 3/00*** | (2006.01) |
| ***B60P 1/48*** | (2006.01) |
| ***B66F 5/04*** | (2006.01) |
| *B66F 13/00* | (2006.01) |

(52) U.S. Cl.

CPC .. *B66F 13/00* (2013.01); *B66F 5/04* (2013.01)

(58) Field of Classification Search

USPC .......................................................... 254/134

See application file for complete search history.

(56) References Cited

U.S. PATENT DOCUMENTS

| | | | | |
|---|---|---|---|---|
| 1,951,398 | A | 3/1934 | Dearsley | |
| 2,029,022 | A | 1/1936 | Graham | |
| 2,051,864 | A | 8/1936 | Knox | |
| 2,219,903 | A | 10/1940 | Pfauser | |
| 2,264,979 | A | 12/1941 | Jackson | |
| 2,370,681 | A * | 3/1945 | Mueller | 254/10 B |
| 2,463,040 | A | 3/1949 | MacPherson | |
| 2,536,550 | A | 1/1951 | Hughes | |
| 2,544,331 | A | 3/1951 | Kogstrom | |
| 2,568,827 | A | 9/1951 | Schallock | |
| 2,596,462 | A * | 5/1952 | Ball | 254/93 R |
| 2,629,583 | A * | 2/1953 | Mueller | 254/8 B |
| 2,702,988 | A | 3/1955 | Rhoads et al. | |
| 3,601,424 | A | 8/1971 | Badland | |
| 3,779,576 | A | 12/1973 | Malcolm | |
| 3,782,689 | A | 1/1974 | Barosko | |
| 3,844,534 | A | 10/1974 | Sessody | |
| 3,907,252 | A | 9/1975 | Gaarder et al. | |
| 4,010,609 | A | 3/1977 | Boutroy | |

(Continued)

FOREIGN PATENT DOCUMENTS

| | | |
|---|---|---|
| JP | 04-066800 | 10/1992 |
| WO | 2004/000624 | 12/2003 |

OTHER PUBLICATIONS

Design U.S. Appl. No. 29/430,827, filed Aug. 30, 2012.

*Primary Examiner* — Lee D Wilson
*Assistant Examiner* — Alvin Grant
(74) *Attorney, Agent, or Firm* — Hahn Loeser & Parks LLP

(57) ABSTRACT

An extension has a main extension body with a first extension end and a second extension end, an extension passage is defined there between. An annular extension recess is formed about the extension passage at the first extension end. An annular extension flange is formed about the extension passage at the second extension end. A saddle has a main saddle body with a first saddle end and a second saddle end with a saddle passage defined there between. An annular saddle flange is formed about the saddle passage at the second saddle end. A fastener has an elongate shaft with a first shaft end and a second shaft end. A head is at the first shaft end. A fastening engagement is about the second shaft end. The shaft is configured to be disposed within the saddle passage and the extension passage.

12 Claims, 11 Drawing Sheets

(56) References Cited

U.S. PATENT DOCUMENTS

| | | | | | |
|---|---|---|---|---|---|
| 4,018,421 | A | * | 4/1977 | Tallman | 254/8 B |
| 4,036,474 | A | | 7/1977 | Owan | |
| 4,056,256 | A | | 11/1977 | Caisley | |
| 4,131,263 | A | | 12/1978 | John | |
| 4,222,548 | A | | 9/1980 | John | |
| 4,241,900 | A | | 12/1980 | Okuda | |
| 4,277,048 | A | | 7/1981 | Okuda et al. | |
| RE30,876 | E | | 3/1982 | Caisley | |
| 4,328,951 | A | | 5/1982 | Laupper | |
| 4,334,667 | A | | 6/1982 | Fox | |
| 4,357,798 | A | | 11/1982 | Hung | |
| 4,509,723 | A | | 4/1985 | Shimura | |
| 4,513,950 | A | | 4/1985 | Yamagishi | |
| 4,558,848 | A | | 12/1985 | Rutter | |
| 4,596,378 | A | | 6/1986 | Liang et al. | |
| 4,635,902 | A | * | 1/1987 | Chou | 254/8 B |
| 4,703,916 | A | | 11/1987 | Hung | |
| 4,742,991 | A | | 5/1988 | Hung | |
| 4,778,199 | A | | 10/1988 | Haggerty et al. | |
| 4,842,252 | A | | 6/1989 | McMahan | |
| 4,865,293 | A | | 9/1989 | Ishi et al. | |
| 4,919,392 | A | | 4/1990 | Minuto | |
| 4,964,617 | A | * | 10/1990 | Lawrence | 254/8 B |
| 5,118,082 | A | * | 6/1992 | Byun | 254/102 |
| D332,337 | S | * | 1/1993 | Wang | D34/31 |
| 5,215,445 | A | | 6/1993 | Chen | |
| 5,221,073 | A | * | 6/1993 | Shockley | 254/8 B |
| 5,251,875 | A | | 10/1993 | Craychee | |
| 5,388,808 | A | | 2/1995 | Laitre | |
| 5,551,668 | A | * | 9/1996 | Hung | 254/8 B |
| 5,711,512 | A | | 1/1998 | Kauffman | |
| 5,979,215 | A | | 11/1999 | Lefavour et al. | |
| 5,992,826 | A | * | 11/1999 | Simmonds | 254/103 |
| 6,000,681 | A | * | 12/1999 | Hussaini | 254/101 |
| 6,035,635 | A | | 3/2000 | Hung | |
| D425,281 | S | | 5/2000 | Ridge | |
| 6,105,940 | A | | 8/2000 | Charette | |
| 6,189,863 | B1 | * | 2/2001 | Blackburn | 254/8 B |
| D443,747 | S | | 6/2001 | Ridge | |
| 6,264,169 | B1 | * | 7/2001 | Hung | 254/8 B |
| 6,270,056 | B1 | * | 8/2001 | Blackburn | 254/8 B |
| 6,295,812 | B1 | | 10/2001 | Hsu | |
| 6,347,786 | B1 | | 2/2002 | Lai | |
| D454,419 | S | * | 3/2002 | Lee et al. | D34/31 |
| 6,357,724 | B1 | * | 3/2002 | Hung | 254/8 B |
| 6,375,160 | B1 | * | 4/2002 | Hung | 254/8 B |
| 6,450,481 | B1 | | 9/2002 | Oxtoby | |
| 6,581,909 | B2 | | 6/2003 | Wixey | |
| 6,622,485 | B2 | | 9/2003 | Hung | |
| 6,663,081 | B1 | * | 12/2003 | Arzouman | 254/8 B |
| 6,748,740 | B2 | | 6/2004 | Fan | |
| 6,789,785 | B2 | | 9/2004 | Hung | |
| D509,039 | S | | 8/2005 | Peschmann et al. | |
| 7,036,796 | B2 | | 5/2006 | Hsu | |
| 7,055,801 | B2 | | 6/2006 | Tatsumi | |
| D548,422 | S | | 8/2007 | Lee et al. | |
| 7,472,889 | B1 | * | 1/2009 | Prather | 254/103 |
| D639,012 | S | | 5/2011 | Ahrenholtz | |
| D641,534 | S | | 7/2011 | Lee et al. | |
| 8,366,074 | B2 | * | 2/2013 | Lin | 254/8 B |
| D683,104 | S | * | 5/2013 | Flournoy et al. | D34/31 |
| 2001/0050358 | A1 | | 12/2001 | Tominaga et al. | |
| 2001/0050359 | A1 | | 12/2001 | Tominaga et al. | |
| 2002/0139964 | A1 | * | 10/2002 | Hung | 254/8 B |
| 2003/0136125 | A1 | | 7/2003 | Hung | |
| 2003/0136951 | A1 | * | 7/2003 | Hung | 254/8 B |
| 2014/0061555 | A1 | * | 3/2014 | Flournoy et al. | 254/134 |

* cited by examiner

REMOVABLE SADDLE AND EXTENSION FOR FLOOR JACK

BACKGROUND

This invention relates in general to floor jacks.

Floor jacks are mechanical devices used to lift loads or apply forces, typically in a vertical direction, when transitioning from a collapsed state to an extended state. In many floor jacks, a horizontal piston engages a vertical lifting member through a linkage, such as a bellcrank.

Floor jacks usually include castors that engage the ground in an extended state and wheels that engage the ground in a collapsed state. This generally provides a low profile, with easy maneuverability, when collapsed, while providing significant lifting forces when transitioning to an extended state.

However, height of a floor jack in the collapsed state and the maximum extension of a floor jack is limited to the design of a particular jack. The collapsed height and maximum extension may be selected depending upon the intended use of the jack, such as use as an automotive lift. For example, a jack to be used for a low profile vehicle, such as a sports car, may have a low collapsed height and a low maximum extension, and a jack to be used for a truck or other high profile vehicle may have a high collapsed height and a high maximum extension.

SUMMARY

This invention relates in particular to a removable saddle and extension for a floor jack.

A removable saddle and extension assembly for a floor jack includes an extension, a saddle and a fastener. The Extension has a main extension body with a first extension end and a second extension end with an extension passage is defined there between. An annular extension recess is formed about the extension passage at the first extension end. An annular extension flange is formed about the extension passage at the second extension end. A saddle has a main saddle body with a first saddle end and a second saddle end with a saddle passage defined there between. An annular saddle flange is formed about the saddle passage at the second saddle end. A fastener has an elongate shaft with a first shaft end and a second shaft end. A head is at the first shaft end. A fastening engagement is about the second shaft end. The shaft is configured to be disposed within the saddle passage and the extension passage.

Various aspects will become apparent to those skilled in the art from the following detailed description and the accompanying drawings.

DETAILED DESCRIPTION

Figure 1:
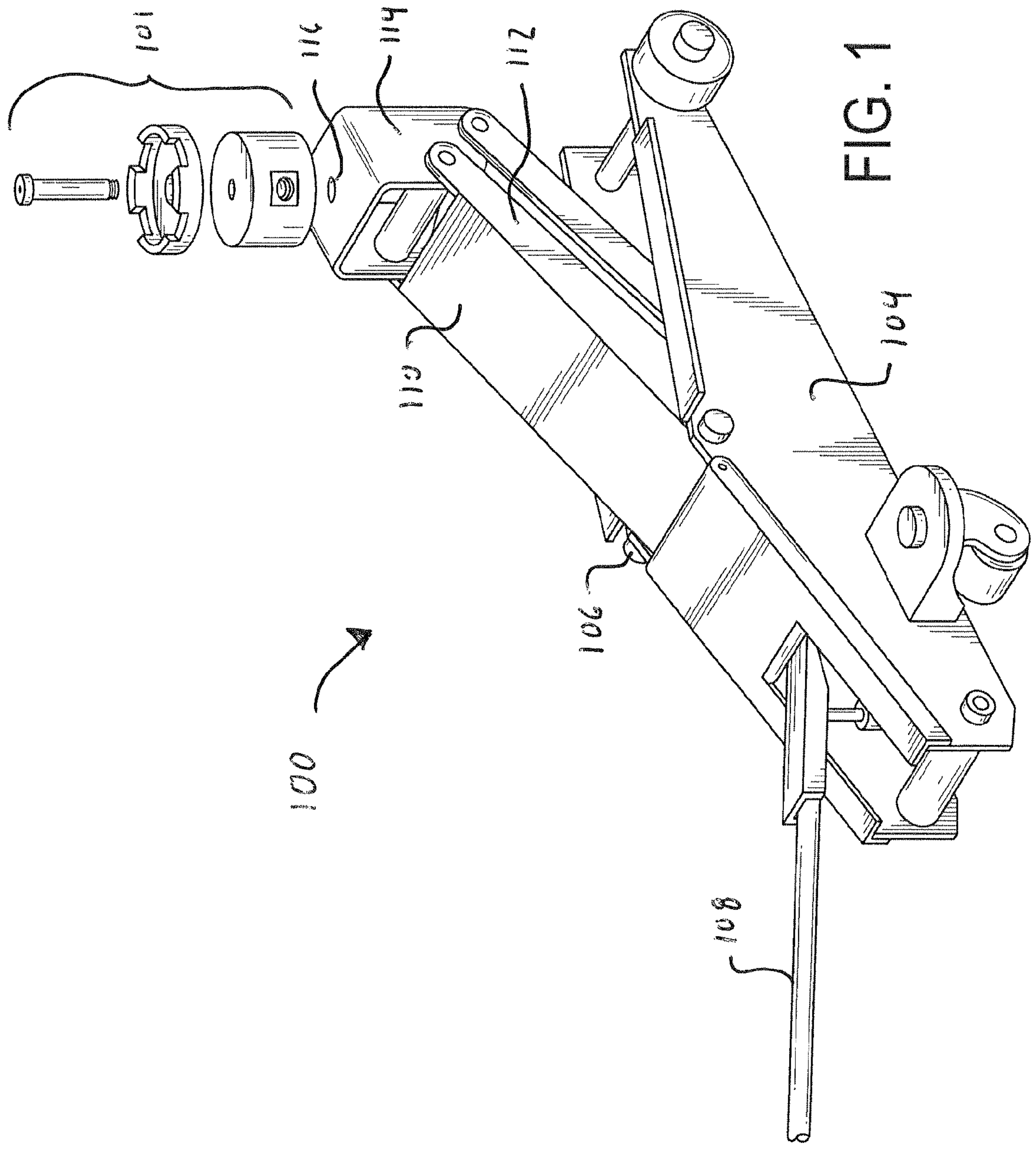
FIG. 1 is a perspective view of a floor jack with a removable saddle and an extension shown in an exploded position.

Referring now to the drawings, there is illustrated in FIG. 1 a floor jack 100 with a removable saddle and extension assembly 101. The jack 100 includes a lifting arm 102 hinged to a support frame 104 at a frame pivot 106.

A handle 108 is provided so as to actuate elevation of a lifting end 110 of the lifting arm 102 relative to the support frame 104. The handle 108 may be provided for pumping hydraulic or pneumatic fluid, in the case of a hydraulic or pneumatic system, for driving gears or other mechanical members, in the case of a mechanical system, or otherwise controlling a drive mechanism, in the case of an electrical or other system.

The lifting end 110 includes sidewalls 112 securing a mounting bracket 114 to the lifting arm 102. The mounting bracket 112 includes a mounting fastening portion 116, which may include a threaded bore or a welded nut, for securing the removable saddle and extension assembly 101 to the mounting bracket 112.

In one exemplary operation of the jack 100, the handle 108 is moved in an up-and-down motion to actuate the lifting arm 102 of the jack 100. The lifting end 110 of the lifting arm 102 is raised away from the support arm 104 as the lifting arm 102 pivots about the pivot point 106. Thus, for example, the removable saddle and extension assembly 101 may engage an underside of a vehicle (not shown) and thereby lift the vehicle as the lifting end 110 is raised. It must be understood that the jack 100 may be a hydraulic or pneumatic lift, mechanical lift, or electrical lift, or any other suitable lift.

Figure 2:
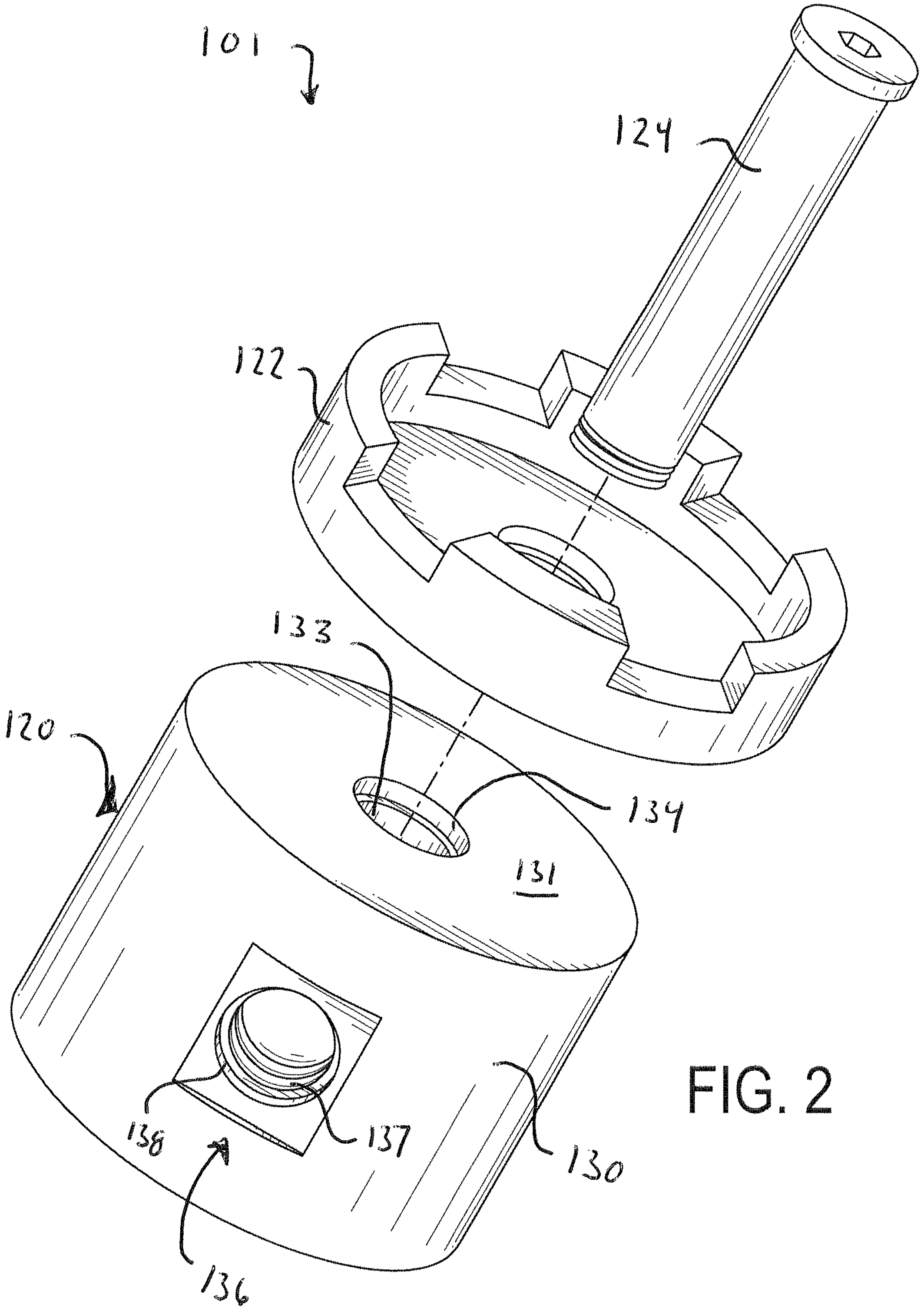
FIG. 2 is an enlarged view of a portion of FIG. 1.
Figure 3:
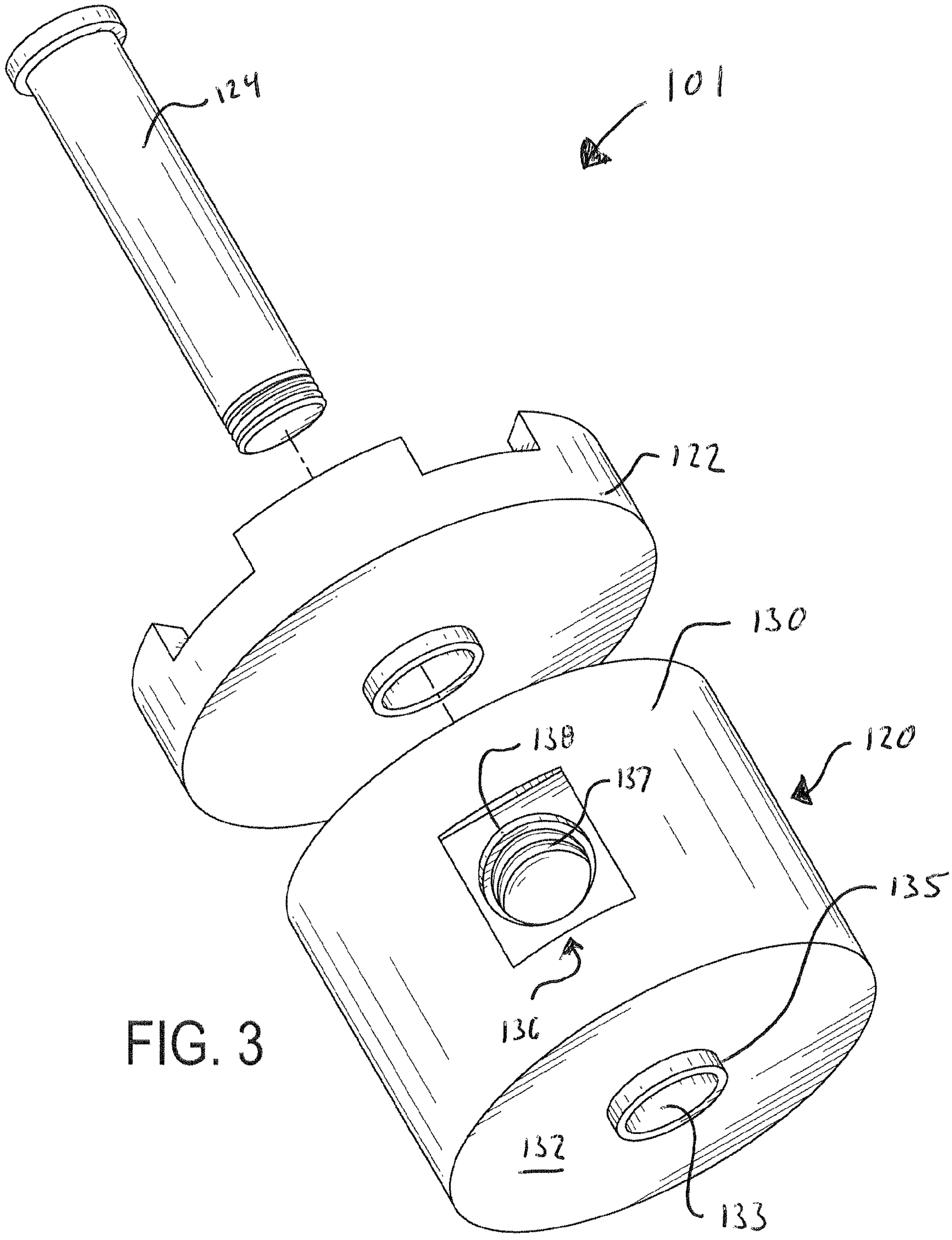
FIG. 3 is a bottom view of the assembly of FIG. 2.

As best shown in FIGS. 2 and 3, the removable saddle and extension assembly 101 includes an extension 120, a saddle 122, and a fastener 124.

Figure 4:
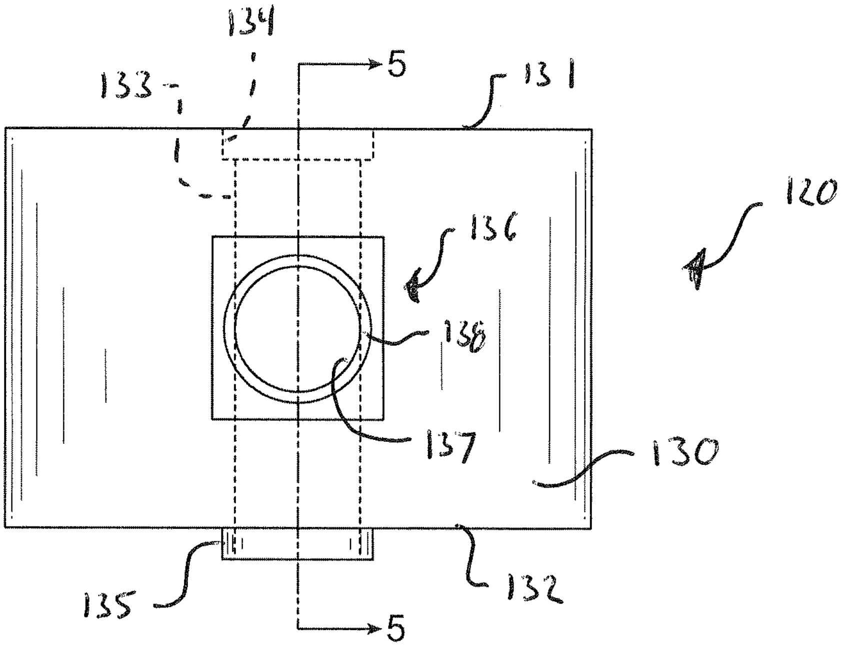
FIG. 4 is a side view of the extension of FIG. 3.
Figure 5:
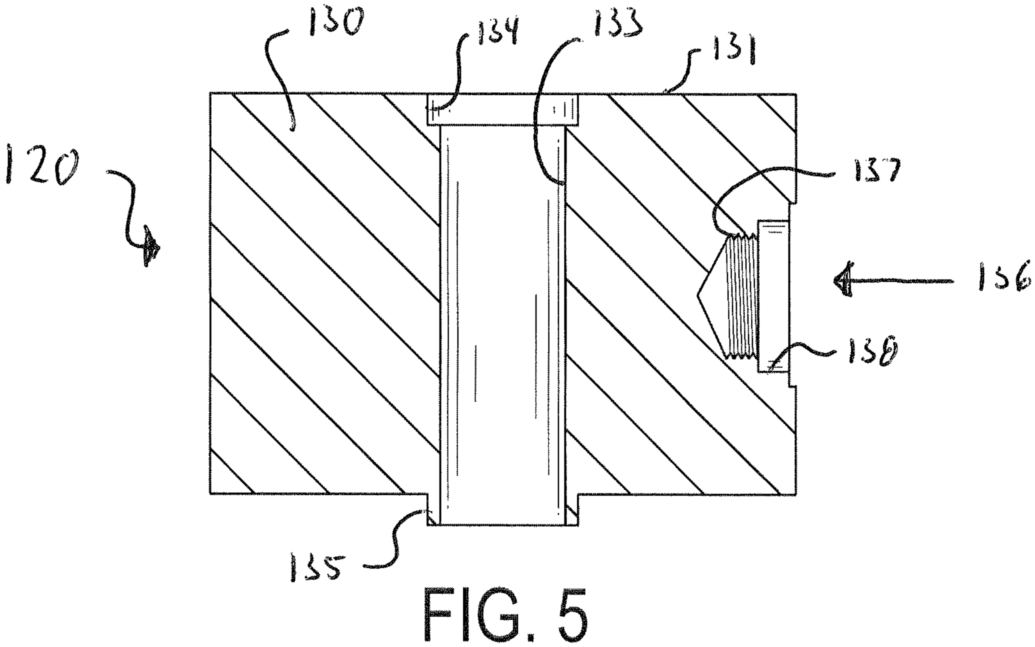
FIG. 5 is a cross-sectional view of the extension of FIG. 4 taken along line 5-5.
Figure 6:
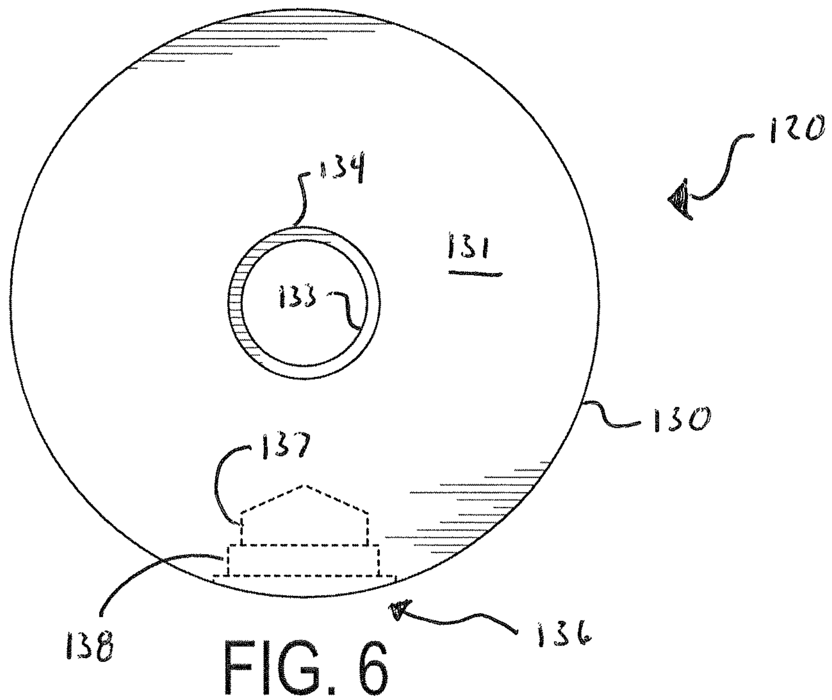
FIG. 6 is a top view of the extension of FIG. 4.
Figure 7:
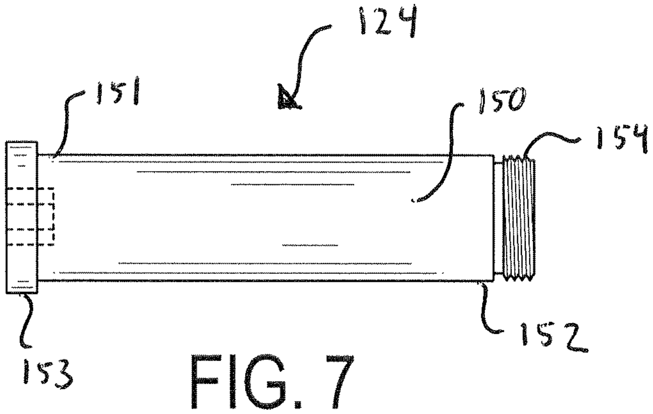
FIG. 7 is a side view of the pin of FIG. 2.

With additional reference to FIGS. 4-6, the extension 120 has a main extension body 130. The main extension body 130 has a first extension end 131 and a second extension end 132 with an extension passage 133 defined there between. An annular extension recess 134 is formed about the extension passage 133 at the first extension end 131. An annular extension flange 135 formed about the extension passage 133 at the second extension end 132.

The main extension body 130 has an extension fastening portion 136. The extension fastening portion 136 includes a threaded bore 137 and an annular bore recess 138.

Figure 10:
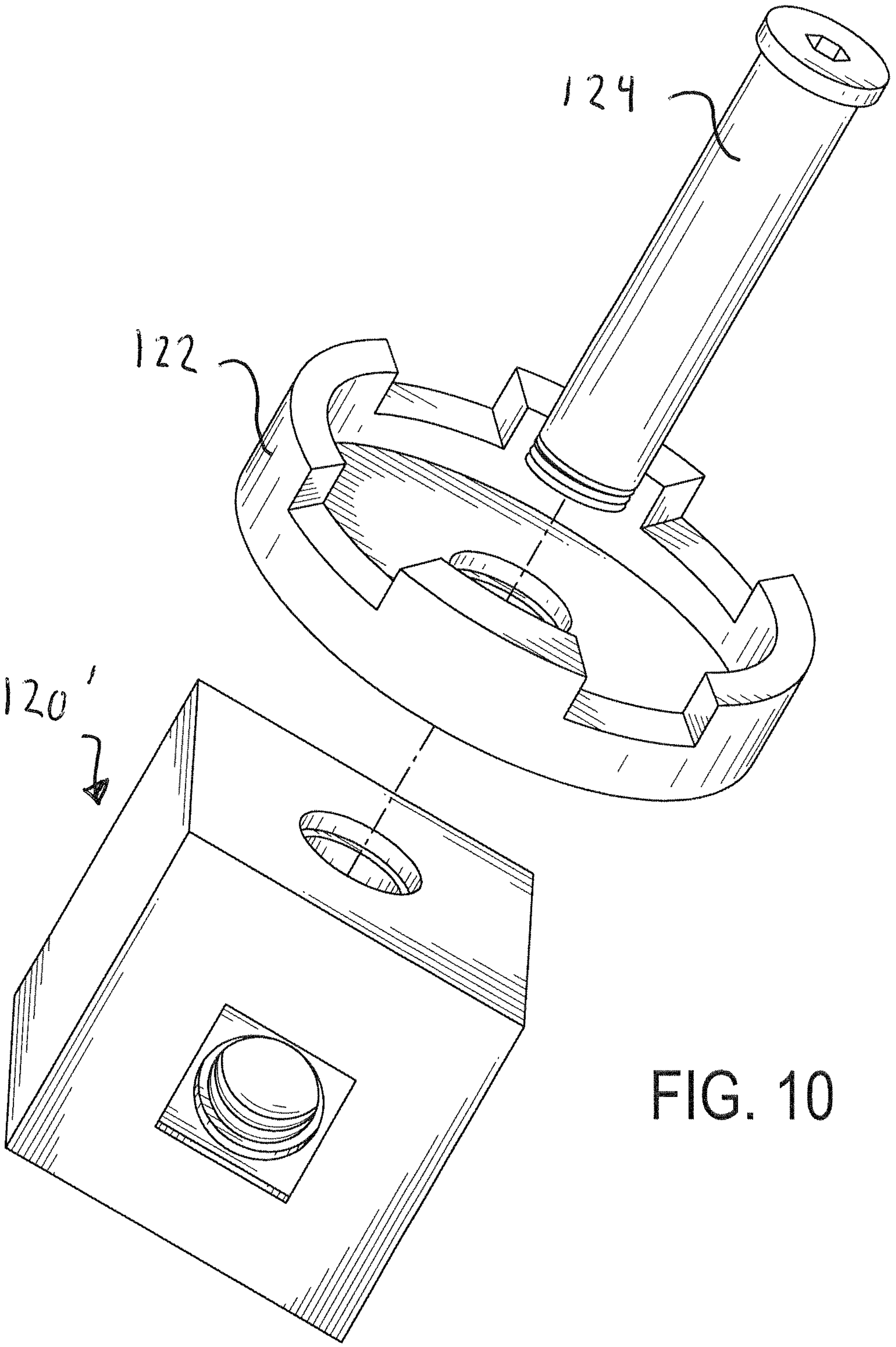
FIG. 10 is a view similar to FIG. 2 of another embodiment.
Figure 11:
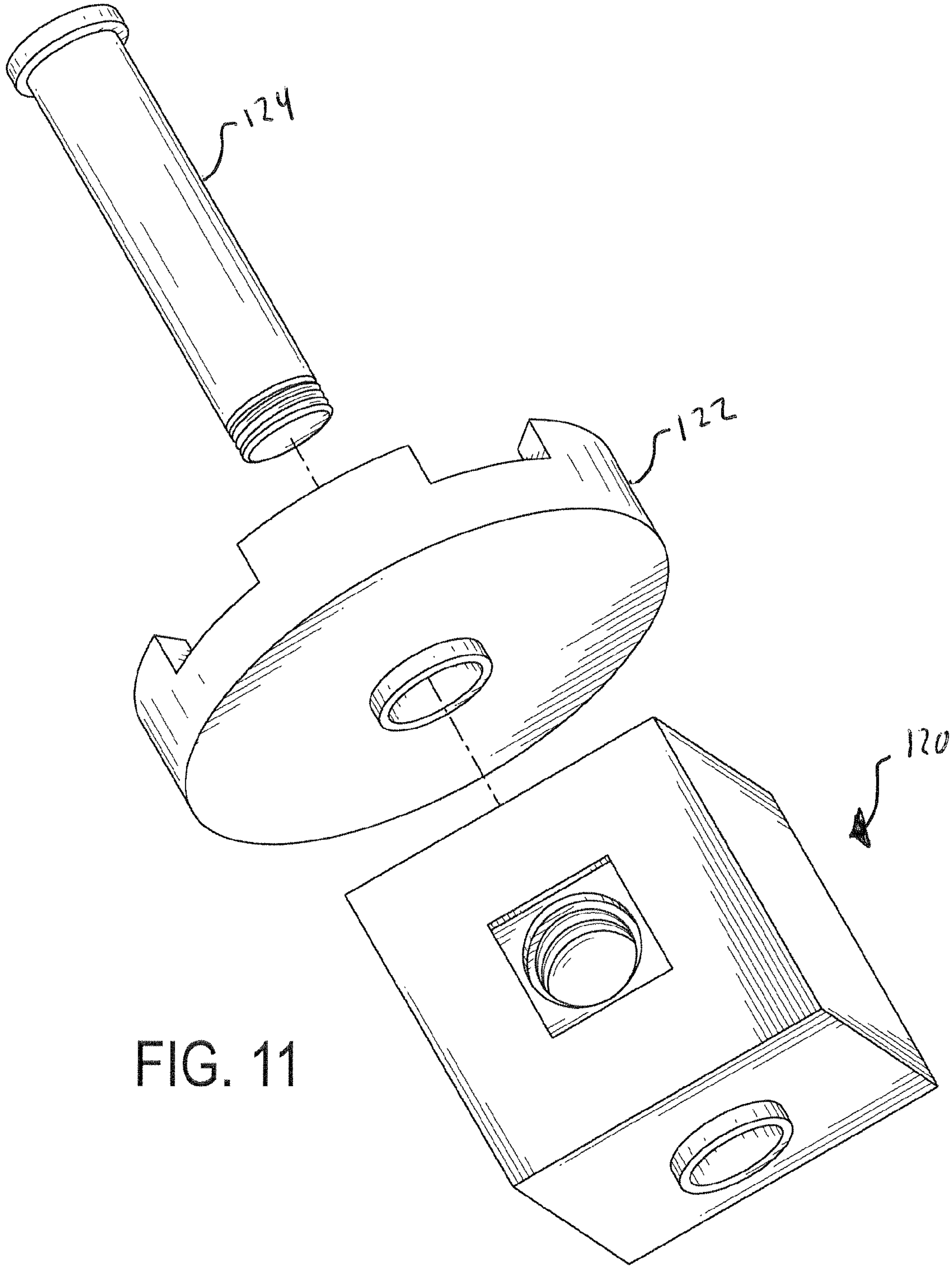
FIG. 11 is a bottom view of the assembly of FIG. 10.

The exemplary main extension body 130 illustrated in FIGS. 1-6 is generally cylindrical, although such is not required. The main extension body may be any suitable shape such as generally cubic, see 120' FIGS. 10-11, or any other suitable shape.

Figure 8:
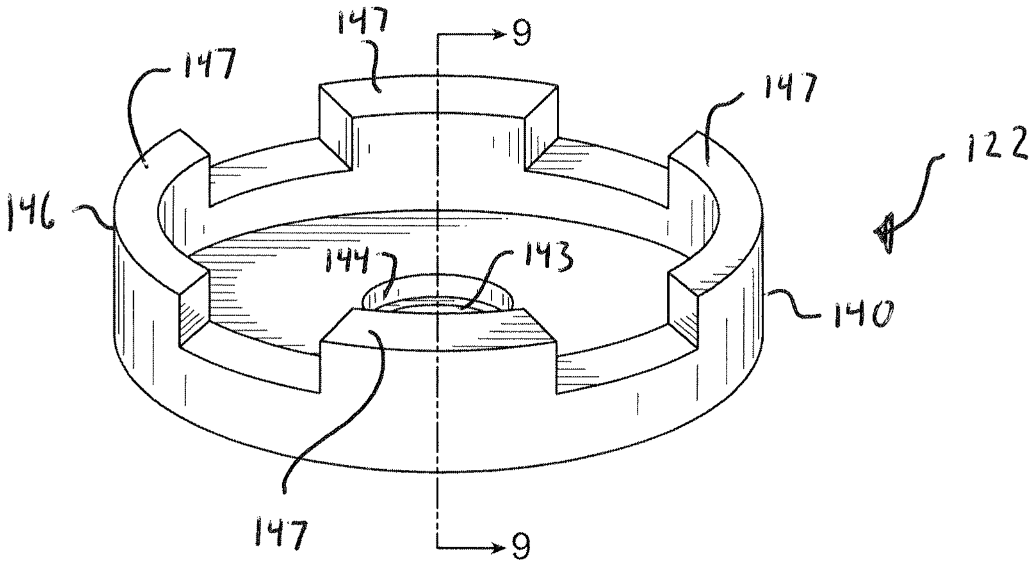
FIG. 8 is a perspective view of the saddle of FIG. 2.
Figure 9:
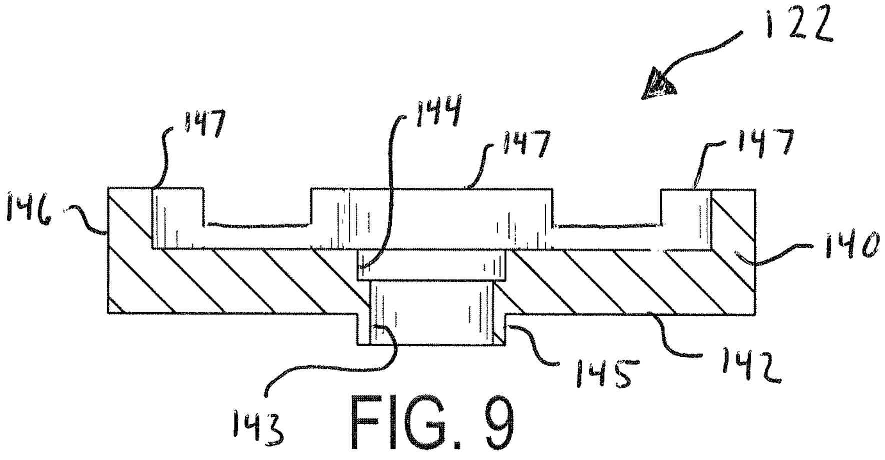
FIG. 9 is a cross-sectional view of the saddle of FIG. 8 taken along line 9-9.

Referring now to FIGS. 8 and 9, the saddle 122 has a main saddle body 140 with a first saddle end 141 and a second saddle end 142 with a saddle passage 143 defined there between. The saddle 122 further includes an annular saddle recess 144 formed about the saddle passage 143 at the first saddle end 141. An annular saddle flange 145 formed about the saddle passage 143 at the second saddle end 142.

The saddle also includes an optional annular circumferential flange 146 formed about the outer periphery of the first saddle end 141. The annular circumferential flange 146 includes discreetly separated lands 147, although such is not required.

The fastener 124 has an elongate shaft 150 with a first shaft end 151 and a second shaft end 152. A head 153 is disposed at the first shaft end 151. A fastening engagement, such as threads, 154 is disposed about the second shaft end 152. The shaft 150 configured to be disposed within the saddle passage 143 and the extension passage 133, preferably formed with sufficient clearance for ease of insertion and removal.

In one embodiment, the extension fastening portion 136 is formed for complementary engagement of the fastening engagement 154 so that when not in use on the jack 100 the fastener 124 may be secured to the extension 120 for storage.

In one embodiment, the annular saddle recess 144 is formed for nesting with the head 153 such that the fastener 124 may be countersunk while in use with the jack 100.

In operation, the removable saddle and extension assembly 101 is secured to the mounting bracket 112 of the jack 100 by the fasteners 124 being disposed within the saddle passage 143 and the extension passage 133 while the head 153 engages the annular saddle recess 144 and the fastening engagement 154 engages the mounting fastening portion 116.

Figure 12:
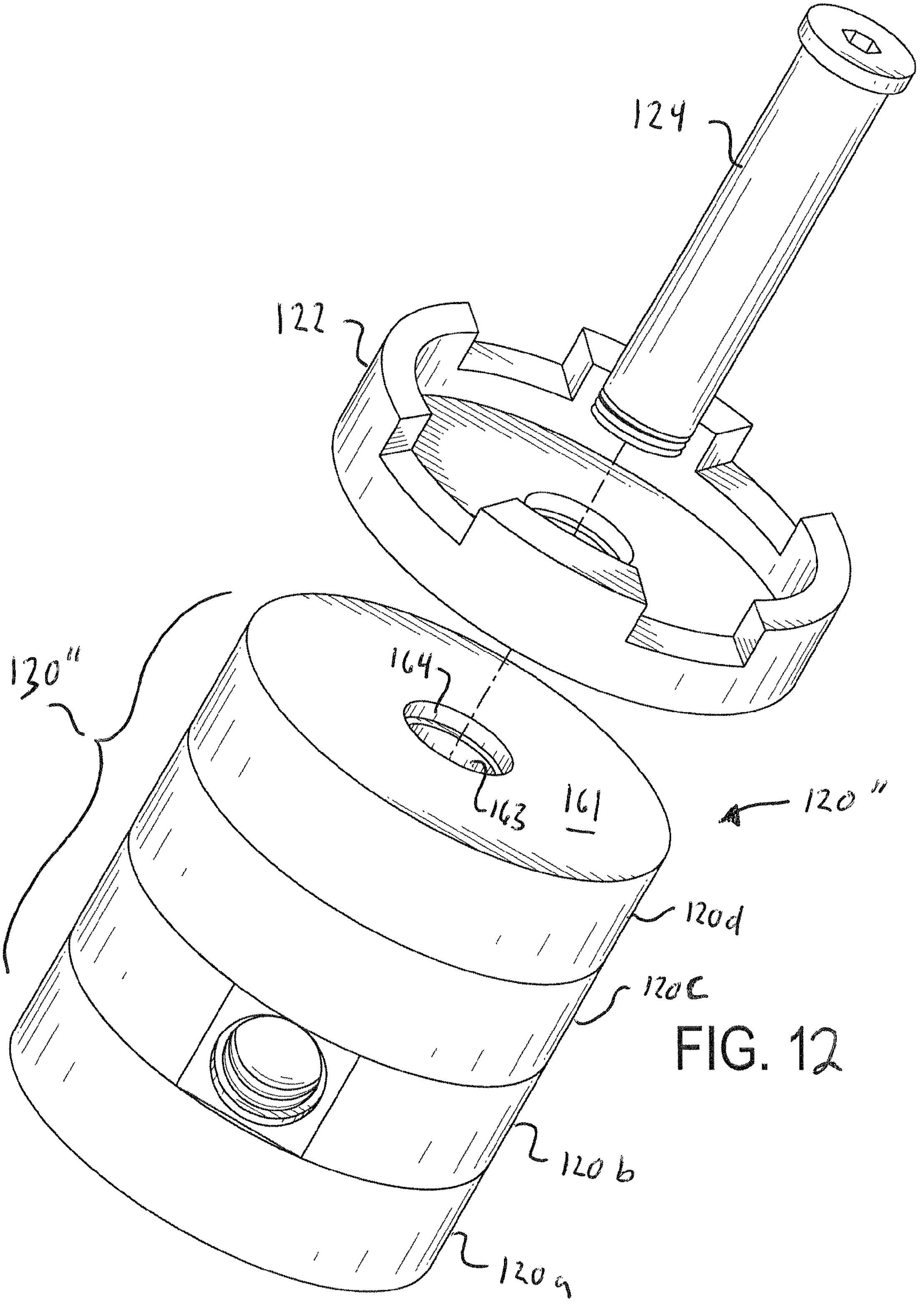
FIG. 12 is a view similar to FIG. 10 of a further embodiment.
Figure 13:
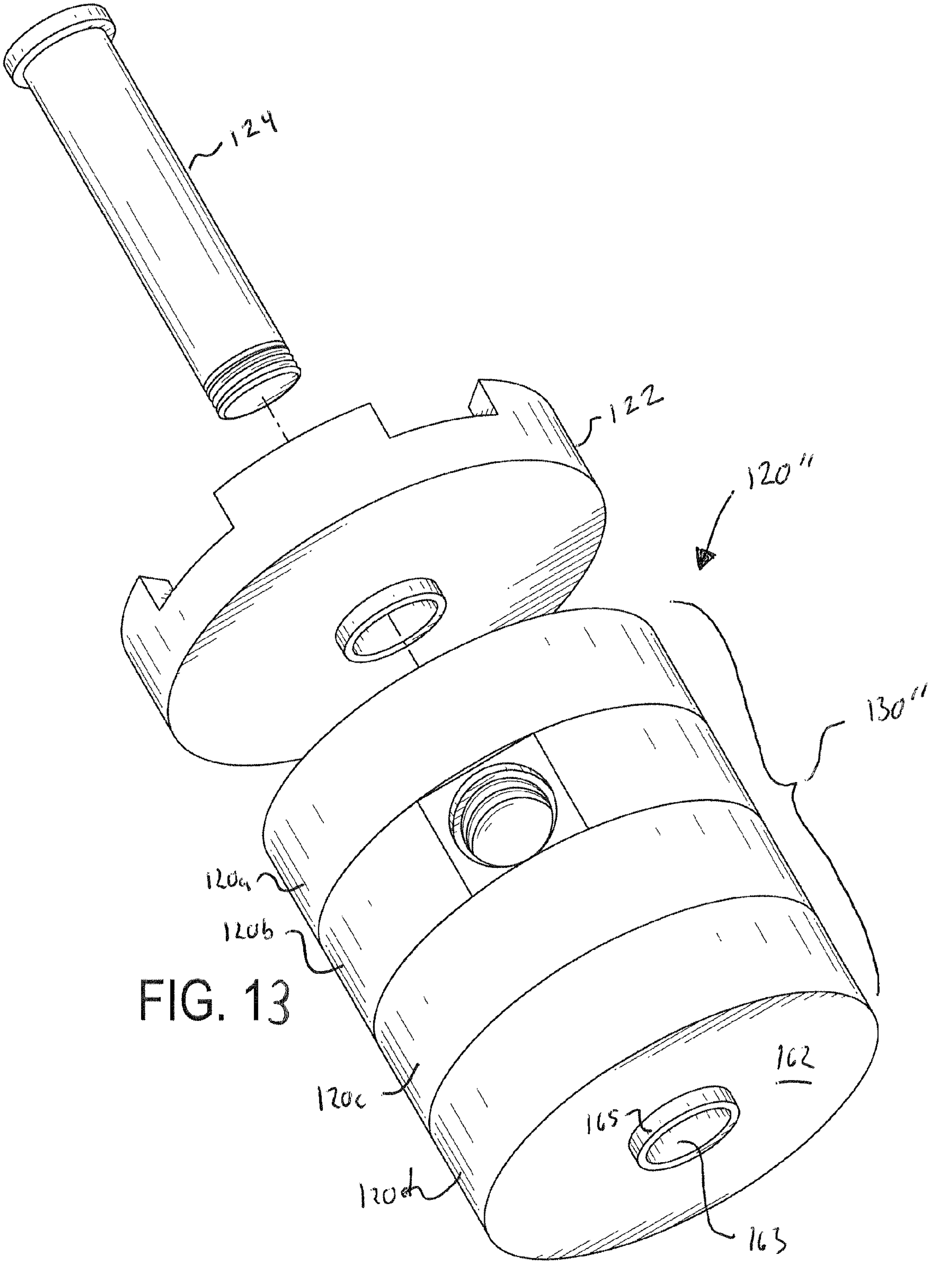
FIG. 13 is a bottom view of the assembly of FIG. 12
Figure 14:
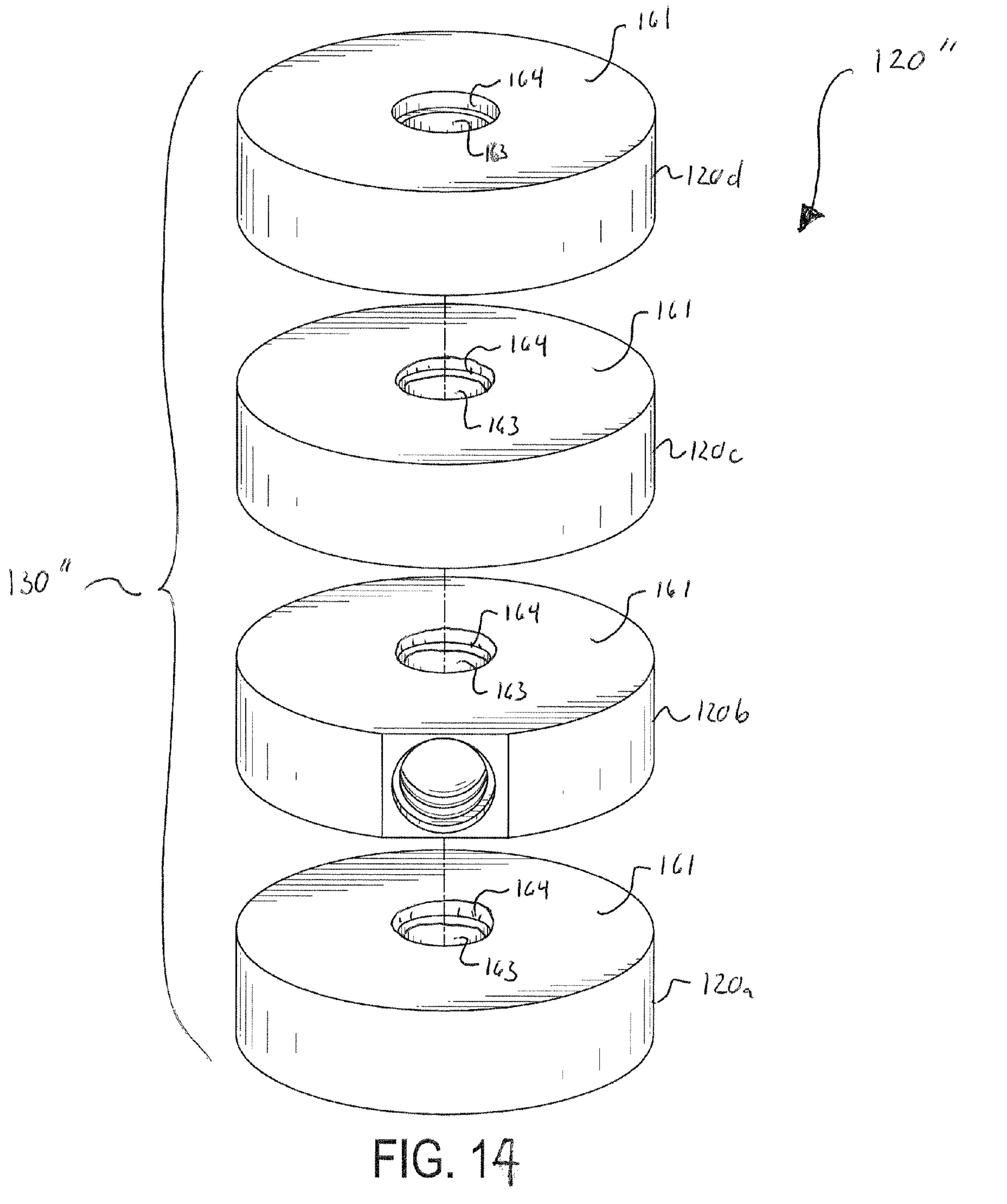
FIG. 14 is an exploded view of the extension of FIG. 13.

As best shown in FIGS. 12-14, it must be understood that the main extension body 130" of the extension 120" may includes a plurality of discrete body portions, such as body portions **120*a*, 120*b*, 120*c*, and 120*d*, with each body portion 120*a*, 120*b*, 120*c*, and 120*d* including a first portion end 161 and a second portion end 162 with a portion of the extension passage defined there between, (see 163**).

An annular portion recess 164 formed about the respective portion 163 of the extension passage at the first portion end 161, and an annular portion flange 165 formed about the portion 163 of the extension passage at the second portion end 162.

The body portions **120*a*, 120*b*, 120*c*, and 120*d* are generally interchangeable and may be used in any desired number to adjust the height of the extension 120"**.

In one method of use, in the case where the jack 100 is provided with a saddle 122, the saddle 122 and any accompanying saddle fastener is removed. The saddle fastener may then optionally be secured to the extension fastening portion 136 for storage.

Next the extension 120 may be placed the mounting bracket 114 such that the annular extension flange 135 nests within the mounting fastening portion 116.

Then, the saddle 122 may be placed upon the extension 120 such that the annular saddle flange 145 nests within the annular extension recess 134.

The fastener 124 may then be placed through the saddle passage 143 and the extension passage 133, and the fastening engagement 154 secured to the mounting fastening portion 116.

In the case where the main extension body 130" includes a plurality of body portions, e.g. **120*a*, 120*b*, 120*c*, and 120*d*, the placing of the extension 120 upon the mounting bracket 114 may include stacking the body portions, e.g. 120*a*, 120*b*, 120*c*, and 120*d***.

While principles and modes of operation have been explained and illustrated with regard to particular embodiments, it must be understood, however, that this may be practiced otherwise than as specifically explained and illustrated without departing from its spirit or scope.

What is claimed is:

1. A removeable saddle and extension assembly for a floor jack comprising:

an extension having a main extension body with a first extension end and a second extension end with an extension passage defined there between, an annular extension recess formed about the extension passage at the first extension end, and an annular extension flange formed about the extension passage at the second extension end;

a saddle having a main saddle body with a first saddle end and a second saddle end with a saddle passage defined there between, and an annular saddle flange formed about the saddle passage at the second saddle end; and a fastener having an elongate shaft with a first shaft end and a second shaft end, a head at the first shaft end, and a fastening engagement about the second shaft end, the shaft configured to be disposed within the saddle passage and the extension passage.

2. The removeable saddle and extension assembly of claim 1 where the saddle further includes an annular saddle recess formed about the saddle passage at the first saddle end, the annular saddle recess formed for nesting with the head.

3. The removeable saddle and extension assembly of claim 1 where the main extension body has an extension fastening portion formed for complementary engagement of the fastening engagement.

4. The removeable saddle and extension assembly of claim 3 where the extension fastening portion includes a threaded bore and an annular bore recess.

5. The removeable saddle and extension assembly of claim 1 where the saddle includes an annular circumferential flange formed about the outer periphery of the first saddle end.

6. The removeable saddle and extension assembly of claim 5 where the annular circumferential flange includes discreetly separated lands.

7. The removeable saddle and extension assembly of claim 1 where the main extension body includes a plurality of body portions each including a first portion end and a second portion end with a portion of the extension passage defined there between, an annular portion recess formed about the respective portion of the extension passage at the first portion end, and an annular portion flange formed about the portion of the extension passage at the second portion end.

8. The removeable saddle and extension assembly of claim 1 where the main extension body is generally cylindrical.

9. The removeable saddle and extension assembly of claim 1 where the main extension body is generally cubic.

10. A method of extending a saddle for a floor jack comprising:

a. providing a floor jack with a mounting bracket having a mounting fastening portion, the mounting bracket secured to a lifting end of the floor jack;

b. providing an extension having a main extension body with a first extension end and a second extension end with an extension passage defined there between, an annular extension recess formed about the extension passage at the first extension end, and an annular extension flange formed about the extension passage at the second extension end;

c. placing the extension upon the mounting bracket such that the annular extension flange nests within the mounting fastening portion;

d. providing a saddle having a main saddle body with a first saddle end and a second saddle end with a saddle passage defined there between, and an annular saddle flange formed about the saddle passage at the second saddle end;

e. placing the saddle upon the extension such that the annular saddle flange nests within the annular extension recess;

f. providing a fastener having an elongate shaft with a first shaft end and a second shaft end, a head at the first shaft end, and a fastening engagement about the second shaft end, the shaft configured to be disposed within the saddle passage and the extension passage;

g. placing the fastener through the saddle passage and the extension passage; and h. securing the fastening engagement to the mounting fastening portion.

11. The method extending a saddle for a floor jack of claim 10 further comprising:

i. prior to placing the extension upon the mounting bracket, removing the saddle from the mounting bracket.

12. The method extending a saddle for a floor jack of claim 10 where the where the main extension body includes a plurality of body portions each including a first portion end and a second portion end with a portion of the extension passage defined there between, an annular portion recess formed about the respective portion of the extension passage at the first portion end, and an annular portion flange formed about the portion of the extension passage at the second portion end, where placing the extension upon the mounting bracket includes stacking the body portions.

* * * * *